(12) United States Patent
Raffaelli

(10) Patent No.: US 10,752,312 B2
(45) Date of Patent: Aug. 25, 2020

(54) MOTOR VEHICLE

(71) Applicant: PIAGGIO & C. S.P.A., Pontedera (IT)

(72) Inventor: Andrea Raffaelli, Pontedera (IT)

(73) Assignee: PIAGGIO & C. S.P.A., Pontedera, Pisa (IT)

( * ) Notice: Subject to any disclaimer, the term of this patent is extended or adjusted under 35 U.S.C. 154(b) by 0 days.

(21) Appl. No.: 15/774,797

(22) PCT Filed: Dec. 27, 2016

(86) PCT No.: PCT/IB2016/058018
§ 371 (c)(1),
(2) Date: May 9, 2018

(87) PCT Pub. No.: WO2017/115274
PCT Pub. Date: Jul. 6, 2017

(65) Prior Publication Data
US 2018/0327044 A1   Nov. 15, 2018

(30) Foreign Application Priority Data

Dec. 28, 2015   (IT) .................. 102015000088085

(51) Int. Cl.
*B62K 5/10* (2013.01)
*B62D 9/02* (2006.01)
(Continued)

(52) U.S. Cl.
CPC .................. *B62K 5/10* (2013.01); *B62D 9/02* (2013.01); *B62K 5/01* (2013.01); *B62K 5/027* (2013.01);
(Continued)

(58) Field of Classification Search
CPC . B62K 5/027; B62K 5/10; B62K 5/08; B62K 2005/001; B62D 9/02
See application file for complete search history.

(56) References Cited

U.S. PATENT DOCUMENTS

| | | | |
|---|---|---|---|
| 6,763,905 B2 * | 7/2004 | Cocco | B60G 21/007 180/210 |
| 7,487,985 B1 * | 2/2009 | Mighell | B62K 5/027 180/210 |

(Continued)

FOREIGN PATENT DOCUMENTS

| | | |
|---|---|---|
| CN | 100333961 C | 8/2007 |
| CN | 102039968 A | 5/2011 |

(Continued)

OTHER PUBLICATIONS

International Search Report and Written Opinion for PCT/IB2016/058018 dated Apr. 10, 2017.

*Primary Examiner* — Ruth Ilan
(74) *Attorney, Agent, or Firm* — Cantor Colburn LLP

(57) ABSTRACT

A motor vehicle (4) comprising a forecarriage frame (16), a pair of front wheels (10', 10") kinematically connected to the forecarriage frame (16) by means of an articulated quadrilateral (20), a steering bar which is mechanically associated with handlebars and wheel support elements of each wheel (10', 10") by means of first and second roll hinges and first and second steering hinges, wherein when the wheels (10', 10") are straight and parallel to the forward direction, the first and second steering hinges are arranged offset from cross members (24', 24") of the articulated quadrilateral (20) in the longitudinal direction such that, with respect to a projection plane parallel to the ground, the straight lines joining the steering axes (S'-S', S"-S") of the wheels (10', 10") with the first and second steering hinges, intersect at a support point of the rear wheel on the ground.

26 Claims, 14 Drawing Sheets

(51) Int. Cl.
  *B62K 5/01*  (2013.01)
  *B62K 5/027*  (2013.01)
  *B62K 5/08*  (2006.01)
  *B62K 5/06*  (2006.01)
  *B62K 5/00*  (2013.01)

(52) U.S. Cl.
  CPC .................. *B62K 5/06* (2013.01); *B62K 5/08* (2013.01); *B62K 2005/001* (2013.01)

(56) References Cited

U.S. PATENT DOCUMENTS

| | | | |
|---|---|---|---|
| 9,452,806 B2 * | 9/2016 | Hirayama | B60G 17/005 |
| 2012/0161410 A1 * | 6/2012 | Ting | B62K 5/02 |
| | | | 280/93.512 |
| 2012/0181765 A1 * | 7/2012 | Hill | B62K 5/027 |
| | | | 280/62 |
| 2014/0091551 A1 * | 4/2014 | Walter | B62K 13/04 |
| | | | 280/267 |
| 2015/0210338 A1 * | 7/2015 | Iizuka | B60G 3/01 |
| | | | 280/267 |
| 2015/0291241 A1 * | 10/2015 | Takano | B62K 5/05 |
| | | | 280/5.509 |
| 2016/0137253 A1 * | 5/2016 | Hirayama | B62K 5/05 |
| | | | 280/124.103 |
| 2016/0229251 A1 * | 8/2016 | Mori | B60G 13/003 |
| 2016/0229480 A1 * | 8/2016 | Mori | B62D 9/02 |
| 2016/0280192 A1 * | 9/2016 | Seto | B60T 8/1706 |
| 2017/0144719 A1 * | 5/2017 | Terada | B62K 3/002 |
| 2017/0203807 A1 * | 7/2017 | Hirakawa | B62K 5/05 |
| 2018/0215433 A1 * | 8/2018 | Raffaelli | B62D 9/02 |
| 2018/0222268 A1 * | 8/2018 | Raffaelli | B60G 3/01 |
| 2018/0222527 A1 * | 8/2018 | Raffaelli | B62D 9/02 |
| 2018/0265155 A1 * | 9/2018 | Raffaelli | B62D 9/02 |
| 2018/0265156 A1 * | 9/2018 | Hara | B62D 5/046 |
| 2018/0265157 A1 * | 9/2018 | Hara | B62K 25/08 |
| 2019/0009633 A1 * | 1/2019 | Raffaelli | B62D 9/02 |

FOREIGN PATENT DOCUMENTS

| | | | | |
|---|---|---|---|---|
| CN | 104245373 A | | 12/2014 | |
| EP | 1484239 A2 | | 12/2004 | |
| EP | 2899107 A1 * | | 7/2015 | ............. B62K 5/027 |
| EP | 2905209 A1 | | 8/2015 | |
| WO | 2010015986 A1 | | 8/2009 | |
| WO | 2015/067760 A1 | | 5/2015 | |

\* cited by examiner

MOTOR VEHICLE

CROSS-REFERENCE TO RELATED APPLICATION

This application is the 35 U.S.C. § 371 national stage application of PCT Application No. PCT/IB2016/058018, filed Dec. 28, 2017, where the PCT claims the priority to and benefit of Italian Patent Application No. 102015000088085, filed Dec. 28, 2015, both of which are herein incorporated by reference in their entireties.

FIELD OF APPLICATION

The present invention relates to a forecarriage of a tilting motor vehicle and a motor vehicle thereof.

STATE OF THE ART

As is known, three-wheeled motor vehicles exist in the art with a rear drive wheel and two steering and tilting wheels. i.e. rolling or inclining, at the front.

Therefore, the rear wheel is intended to provide torque and thus allow traction while the front wheels, paired, are intended to provide the directionality of the vehicle.

Using two front wheels, instead of two rear wheels, avoids the addition of a differential for torque transmission. This way a reduction of costs and weights at the rear axle can be achieved.

The paired wheels at the forecarriage in addition to steering, can tilt and roll: this way, compared to three-wheeled vehicles with two wheels at the rear axle, vehicles with two wheels at the forecarriage are equivalent to an actual motorbike since, just like a motorbike, the vehicle is able to tilt when cornering.

Compared to a motor vehicle with only two-wheels, such vehicles with two paired wheels on the forecarriage have however a greater stability ensured by the dual resting on the ground of the front wheels, similar to that provided by a car.

The front wheels are kinematically connected to each other by means of kinematic mechanisms which enable the same to roll and/or steer synchronously and in a specular manner for example through the interposition of articulated quadrilaterals.

In particular, to drive a vehicle with two front wheels the rotation of the handlebar must be connected to that of the wheels, which are thus interconnected even in the steering movement.

In principle, the wheels can be connected by a single steering bar or two and in the latter case, two identical rods can be used, placed symmetrically in relation to the median plane of the vehicle, or a first rod may be provided connecting the steering to a single wheel and a second rod which instead connects the two wheels to each other.

The actual steering angle made by each individual wheel, generally does not depend only on the wishes of the driver expressed by rotating the handlebar, but also by the interaction of the rolling or spring suspension (also called shaking) movements on the steering of the wheel. This interaction is called steering correction and is sometimes consciously exploited to change the behaviour of the vehicle. For example, corrections are used to compensate wheel movements dictated by suspensions which are often simplified, exploiting the fact that the steering gear ratio helps to filter what is perceived by the driver.

The geometric definition of the steering system is therefore essential for good dynamic behaviour of the vehicle, particularly if the latter is rolling, the wheels have very extended movements which amplify the unwanted movements deriving from imperfect steering schemes so that usually steering corrections are limited as much as possible.

In the prior art, the most widespread way of connecting the steering of the wheels of a rolling forecarriage is to place the steering hinges on the wheels so that they have an equal wheelbase at the transverse sides of the quadrilateral which allows the rolling, wherein said steering hinges are connected to a system that traces said quadrilateral—with a single rod if the quadrilateral is not interrupted, or with a double rod if the quadrilateral is interrupted. In practice this consists of adding an identical side to the existing one of the quadrilateral.

In general therefore, the connection with the wheel is by means of a spherical hinge or a pair of cylindrical hinges incident to each other to allow both rolling and steering, wherein said cylindrical hinges are placed in a plane parallel to the median plane of the vehicle: such hinges may have any relative angle but the most convenient choice is to have them orthogonal to each other and parallel to the rolling and steering axes, so that they work selectively on said movements.

As a result, realising a steering wheel which is decoupled from the rolling or spring suspension movements is a known construction scheme (used for example in a vehicle called MP3, by the same applicant) provided that it has the characteristic of steering the wheels by the same angle; this connection scheme is therefore kinematically incorrect since it imposes a dragging of the wheels on the ground on account of the fact that there are two separate centres of instantaneous rotation. This effect increases the wear on the tyres and makes for steering which becomes harder the farther it is from the theoretical kinematic steering condition, for which the front wheels and the rear axle (with one or two wheels) have a common centre of instant bending, and this effect increases as the carriageway and the steering angle increase as well as the frictional force on the ground between the tyres and the ground.

In automobiles instead, kinematic steering is common even though there are examples of forecarriages of vehicles with parallel wheel steering when, for example, one wishes to take advantage of the increased grip at the front to compensate for unbalanced weight distribution at the back. In particular, since the 19th century a kinematic mechanism has been known of which approximates kinematic steering, known as Jantaud if placed behind the front wheel axle or Ackerman if placed in front of said axle: this involves placing the steering bar parallel to the front axle and at any distance as long as the hinges at its ends are on the straight line joining the respective front wheel with the centre of the rear axle (in a three-wheeled vehicle, the centre of the single rear wheel).

An example of three-wheeled vehicle construction, of which two front and one rear, according to Jantaud and Ackermann kinematic steering is schematised in FIG. 1c.

The diagram is usually represented in the plan view because cars do not have a macroscopic roll, in the case instead of a rolling vehicle the diagram continues to represent the case of rolling with a very limited angle, while as the rolling angle increases, the diagram becomes more complicated since the triangle of where the wheels rest on the ground is deformed, in that the wheels move vertically according to the angle imposed by the rolling quadrilateral (as a result the inner wheel "lifts" and the outer wheel "drops" with respect to the vehicle frame) and the uniqueness of the centre of instantaneous rotation is lost, present instead with zero rolling.

If the centre of the spherical hinge or pair of cylindrical hinges (equivalent to a spherical hinge) is placed on the wheel side suggested by kinematic steering, the length of the steering bar assumes a different value (lower, in the Jantaud-set back from the steering axle/higher, in Ackerman, i.e. set forward of the steering axle) of the width of the quadrilateral, creating a coupling between steering and rolling which becomes higher the greater such difference is.

For example, if one imagines rolling a vehicle fitted in the front view with the quadrilateral, the shortest bar of the quadrilateral imposes an opening of the wheels at the front.

Consequently, in the automotive industry, the Jantaud or Ackerman solution is effective since the low rolling angle of the vehicle does not involve a coupling between steering and rolling such as to prejudice the dynamic behaviour of the vehicle, in terms of tyre wear and resistance i.e. hardness of actuating the steering. Obviously such parameters are instead critical in a tilting vehicle where the rolling angle, and hence the corresponding coupling between steering and rolling is far greater and far from negligible. Moreover, the increased wear and steering stiffness which in cars are well disguised to the user, would instead be unacceptable for a motorcycle. In fact in cars tyres have a duration about quadruple compared to motorcycles and, with regard to steering, cars now universally make use of power steering systems which de facto compensate any increase in effort (something which is not provided for in motorcycles).

It is therefore clear that the solution of kinematic steering known in the automotive industry is not adaptable as is to the sector of three-wheeled tilting motorcycles.

Above all it is to be noted that tilting three-wheeled motorcycles are designed to provide the user with the handling of a two-wheel motorcycle and, at the same time, the stability and safety of a four-wheeled vehicle.

Said two predefined goals are antithetical since greater stability requires the presence of additional elements compared to a two-wheeled motor vehicle (such as the third wheel and its relative kinematic mechanisms) which inevitably weigh down the structure of the vehicle.

Moreover, the presence of 'only' three wheels cannot per force guarantee the stability and roadholding of a four-wheeled vehicle.

Therefore, it is essential to develop a three-wheeled vehicle that can mediate these antithetical objectives, while ensuring stability and handling, as well as reliability and low costs.

To achieve such purposes a specific geometry of the front portion of the frame or forecarriage and of the steering mechanism of the tilting and steering front wheels must be developed to support the front wheels in their steering and tilting movement while ensuring safety, stability, reliability, but also agility to manoeuvre, limited effort to use and good handling for the user.

PRESENTATION OF THE INVENTION

To resolve the aforesaid problems, to date many solutions have been adopted in the art of three-wheeled vehicles, of which two on the forecarriage.

Such solutions of the prior art fail to optimise the need for stability and handling described above.

The need is therefore felt to resolve the drawbacks and limitations mentioned with reference to the prior art.

Such purpose is achieved by a motor vehicle according to claim 1.

DESCRIPTION OF THE DRAWINGS

Further characteristics and advantages of the present invention will be more clearly comprehensible from the description given below of its preferred and non-limiting embodiments, wherein.

The elements or parts of elements common to the embodiments described below will be indicated using the same reference numerals.

DETAILED DESCRIPTION

Figure 1A:
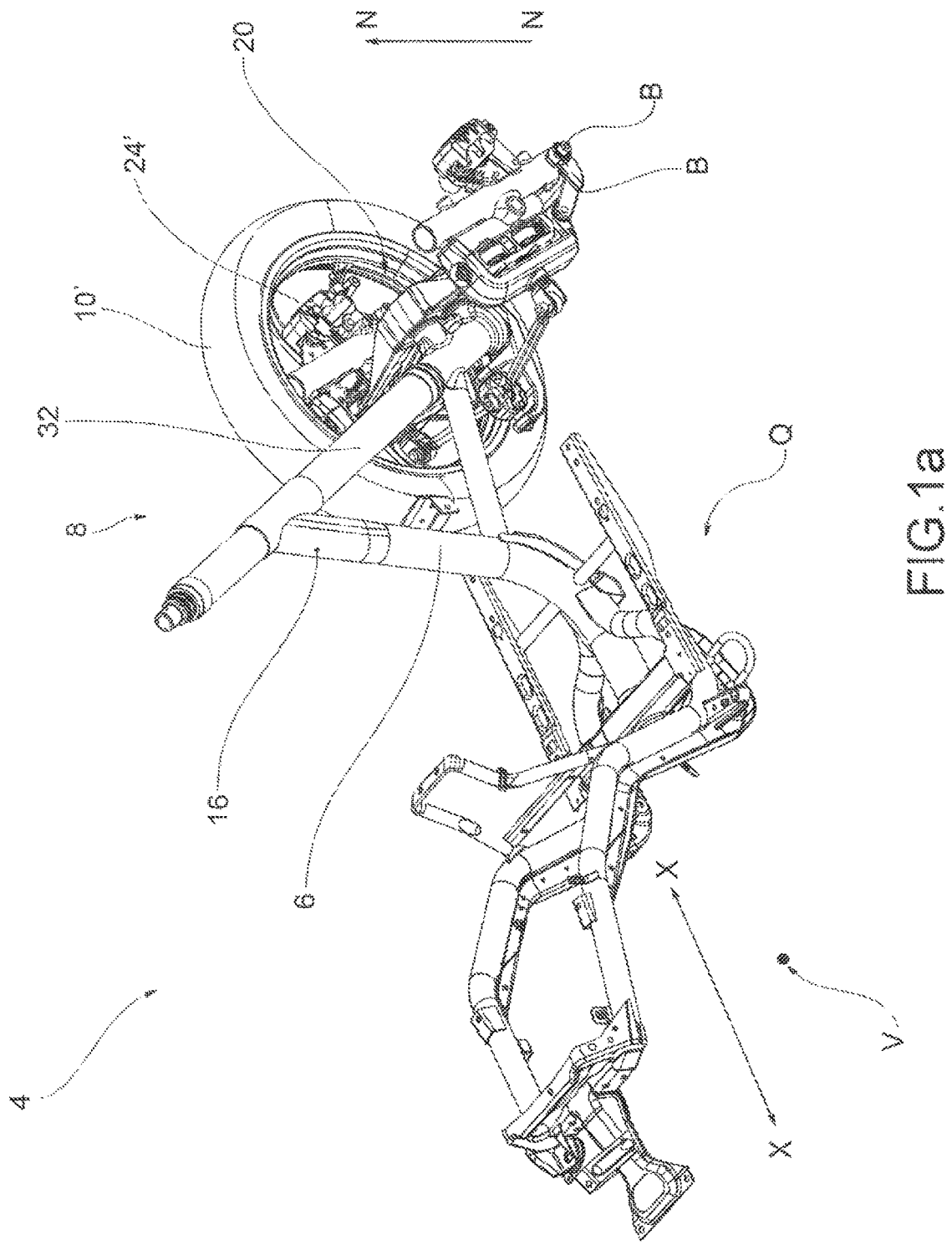
FIG. 1a is a perspective view of a motor vehicle according to one embodiment of the present invention, where some elements have been removed.
Figure 1B:
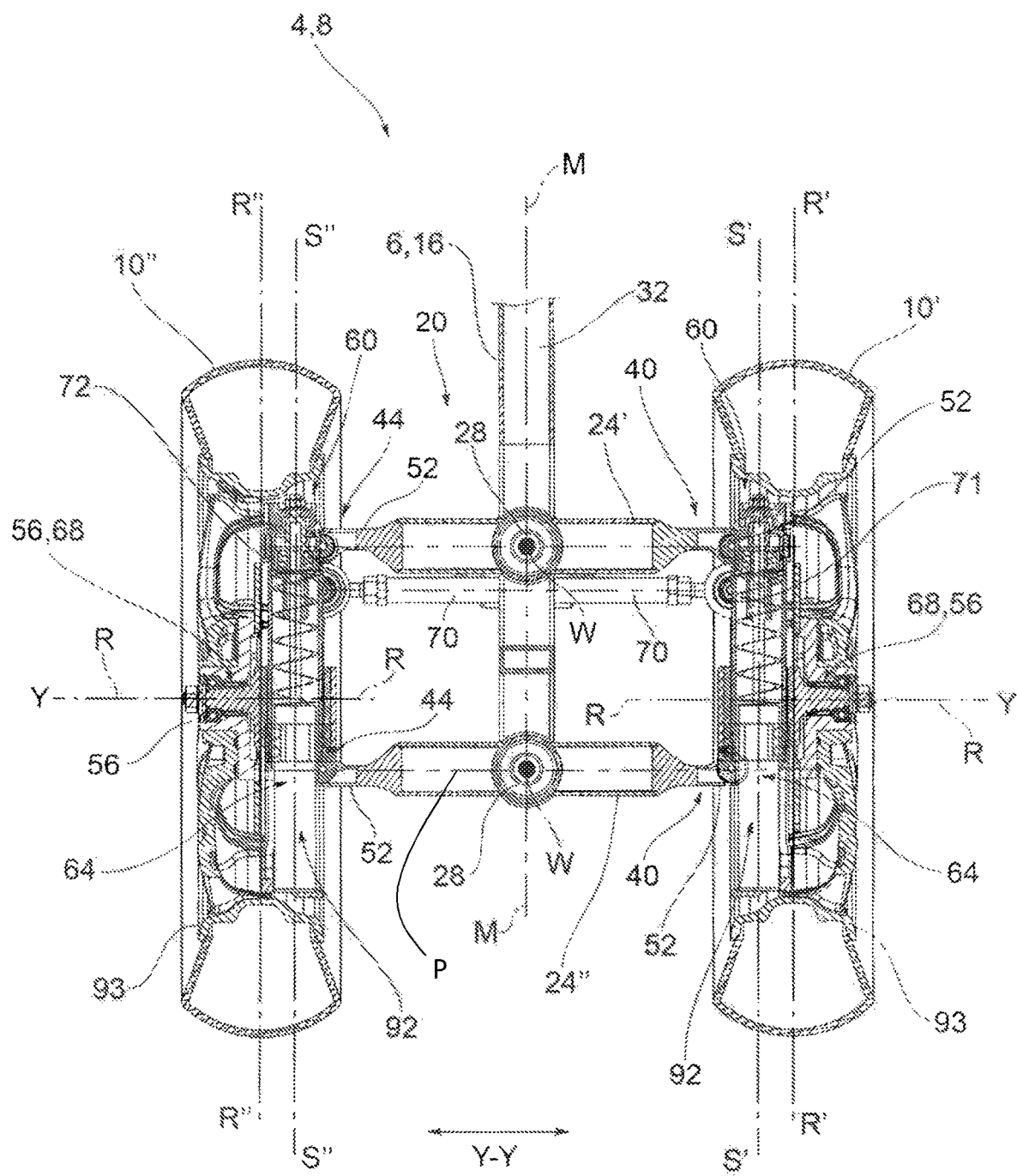
FIG. 1b shows a front view of a forecarriage of a motor vehicle according to one embodiment of the present invention.
Figure 1C:
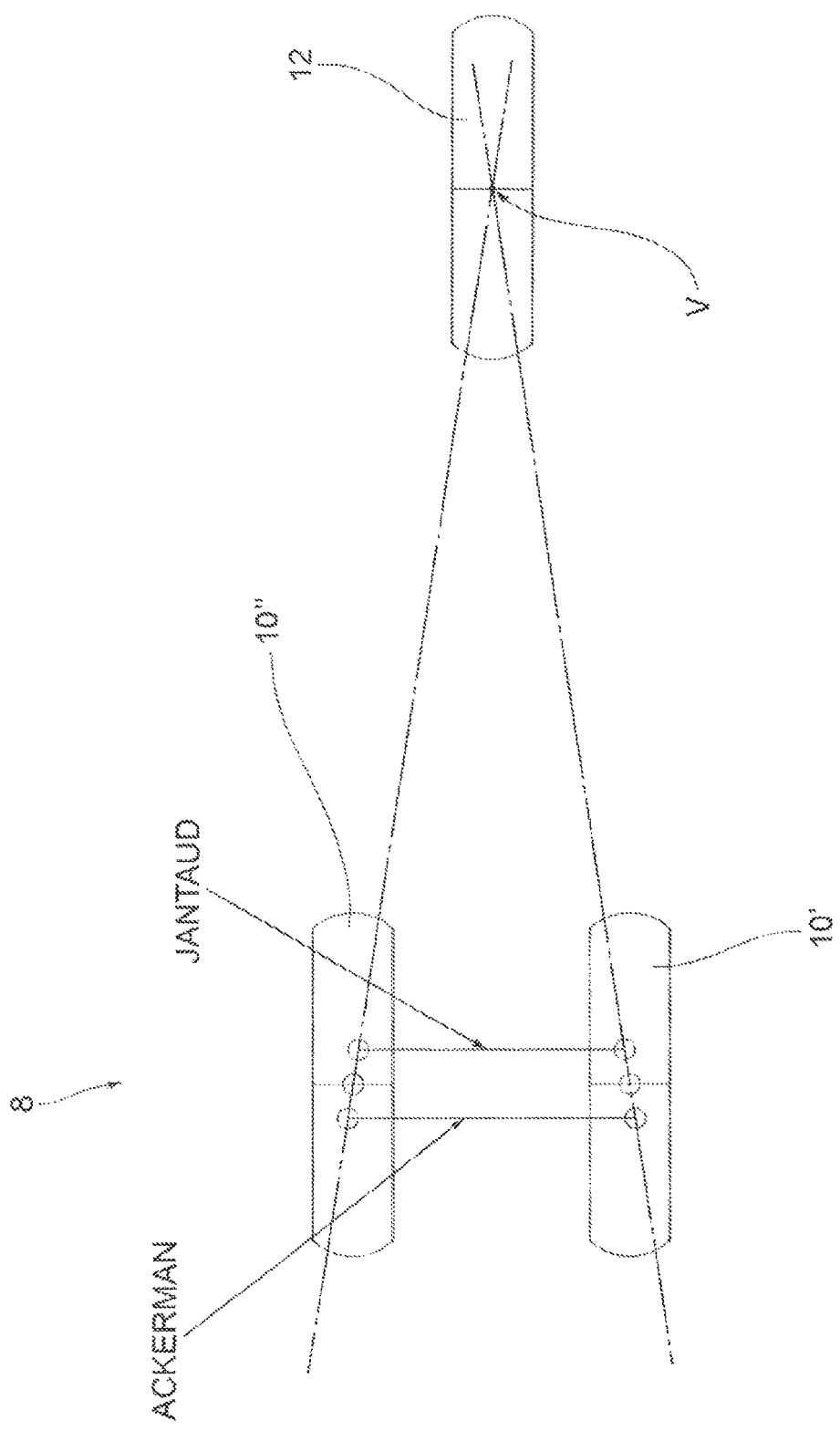
FIG. 1c shows a schematic, plan view of a motorcycle with three wheels, of which two front steering wheels and a rear wheel, with the steering bar positioned according to Ackerman kinematic steering, i.e. set forward in the direction of travel, and according to Jantaud kinematic steering, i.e. set back relative to the direction of travel.
Figure 2:
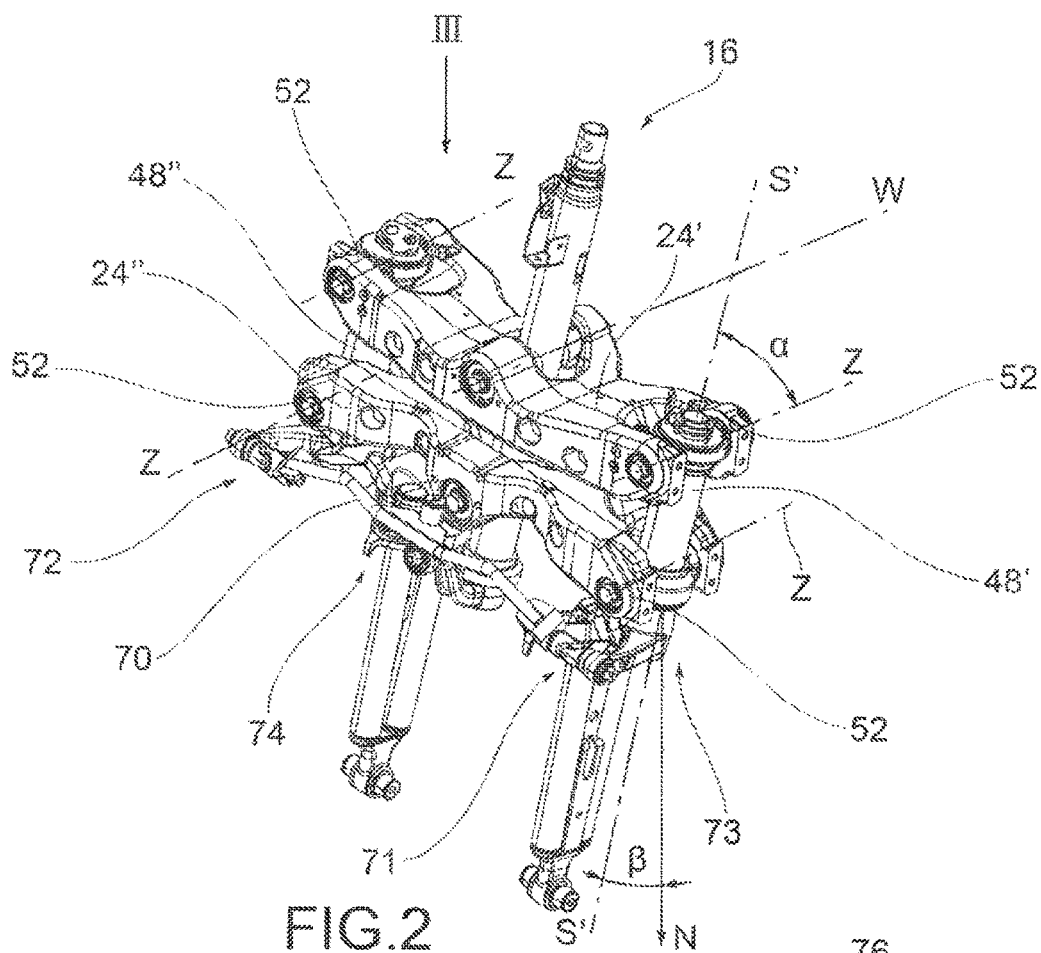
FIG. 2 shows a perspective view of a forecarriage of a motor vehicle according to one embodiment of the present invention.
Figure 3:
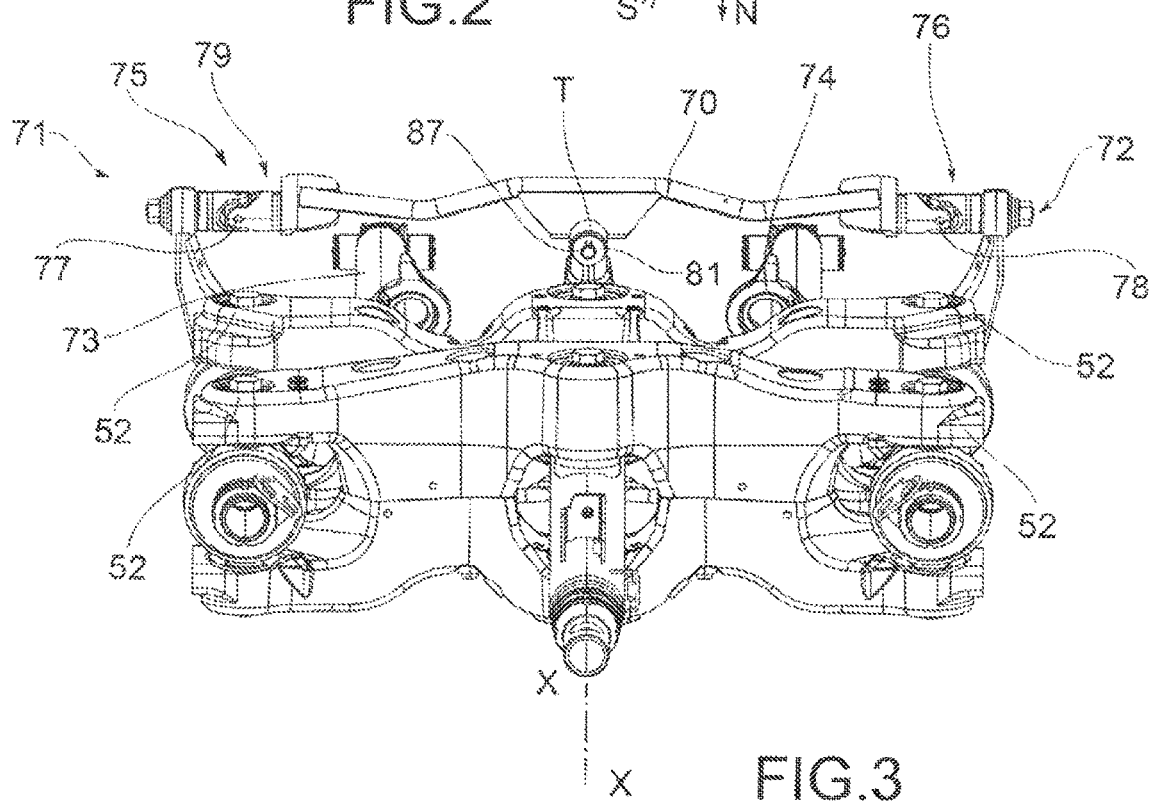
FIG. 3 shows a perspective view of the forecarriage in FIG. 2 from the side of the arrow III in FIG. 2.
Figure 4:
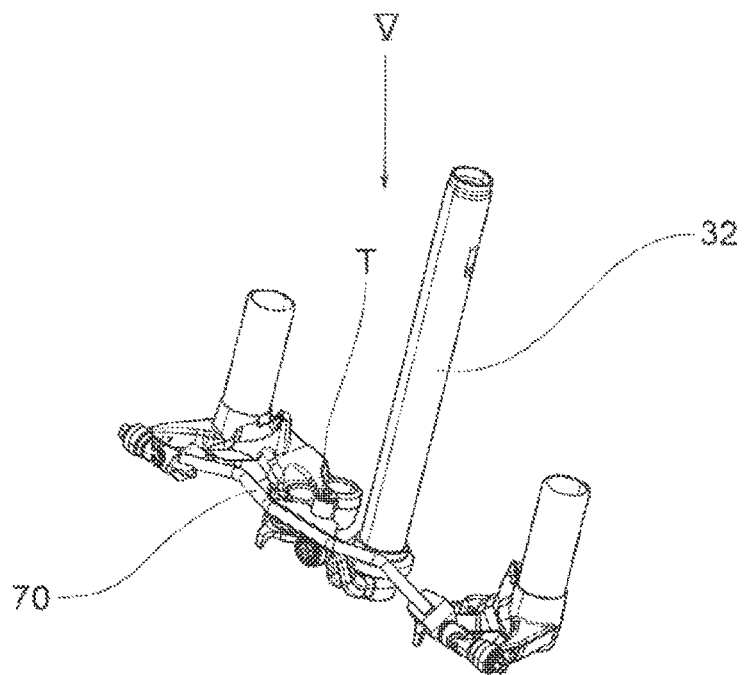
FIG. 4 shows a perspective view of a detail of the forecarriage in FIG. 2.
Figure 5:
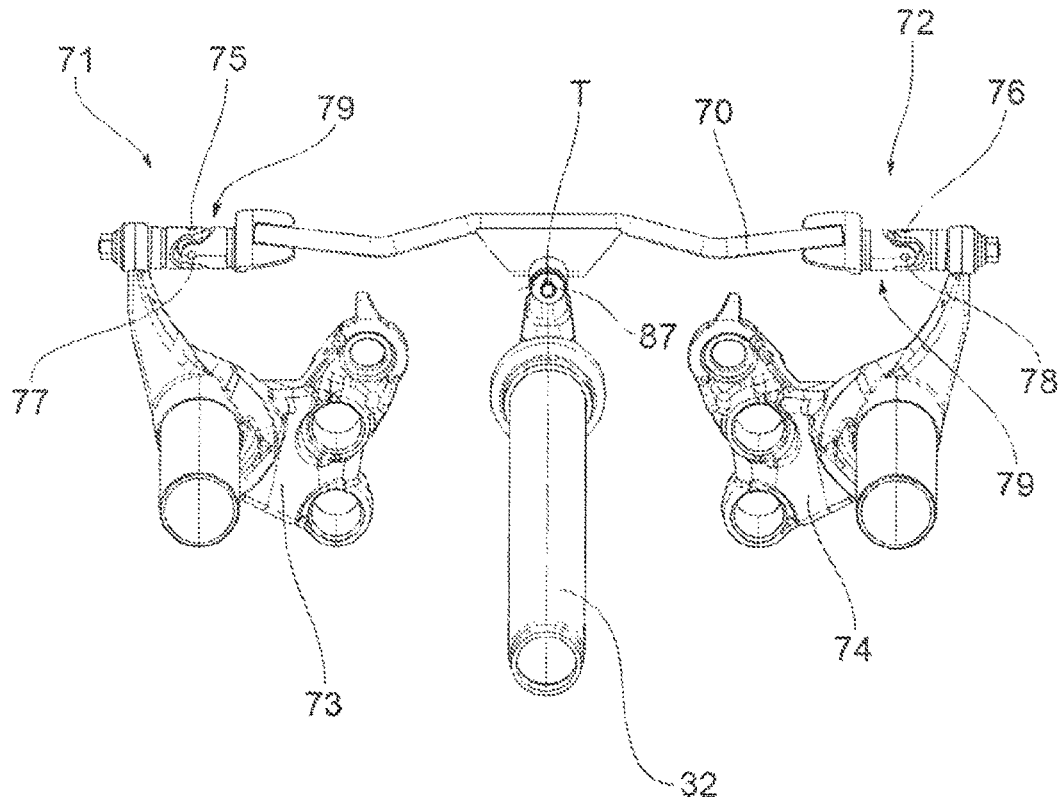
FIG. 5 shows a perspective view of the detail of the forecarriage in FIG. 4 from the side of the arrow V in FIG. 4.
Figure 6:
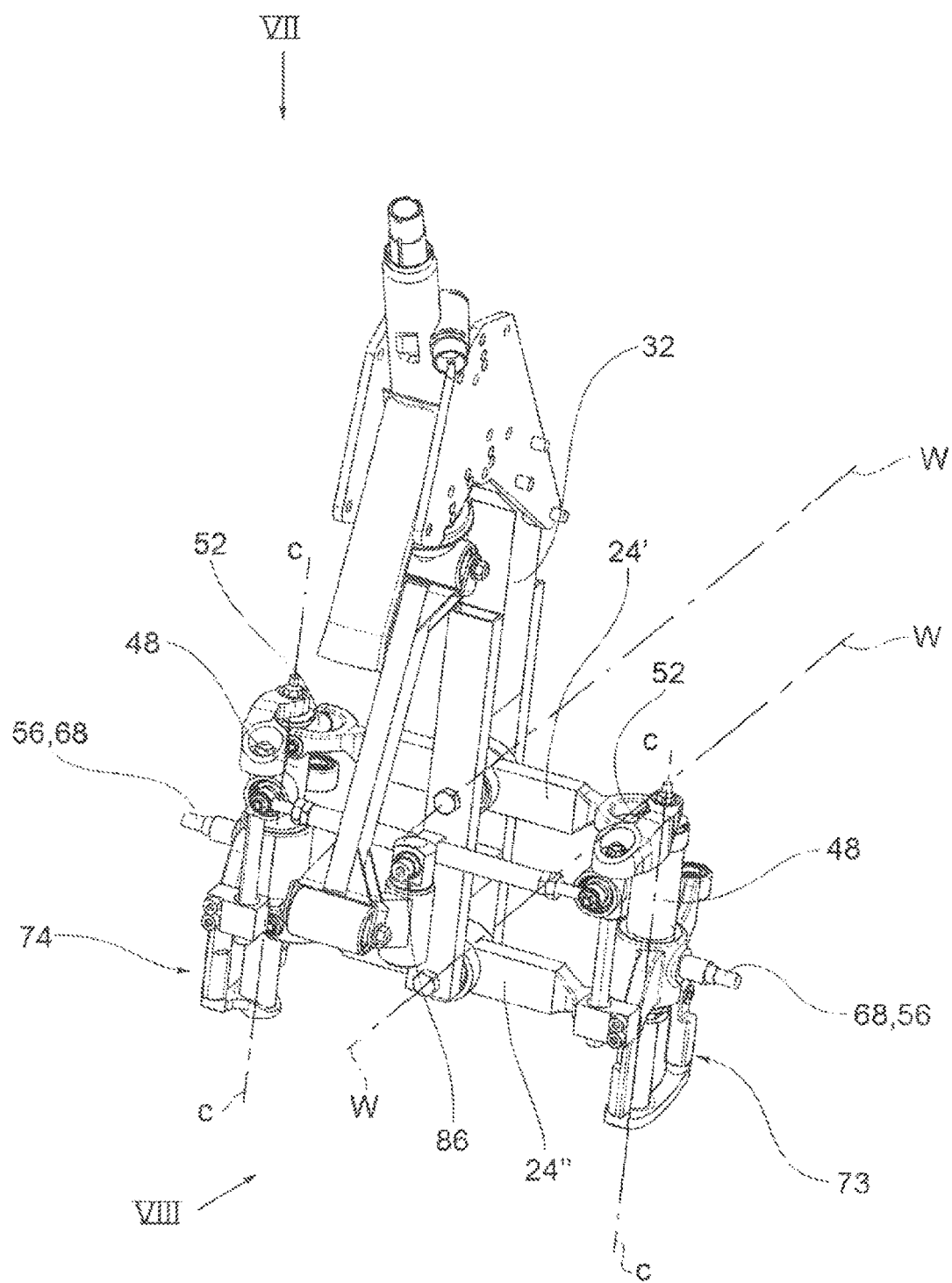
FIG. 6 shows a perspective view of a forecarriage of a motor vehicle according to a further embodiment of the present invention.
Figure 7:
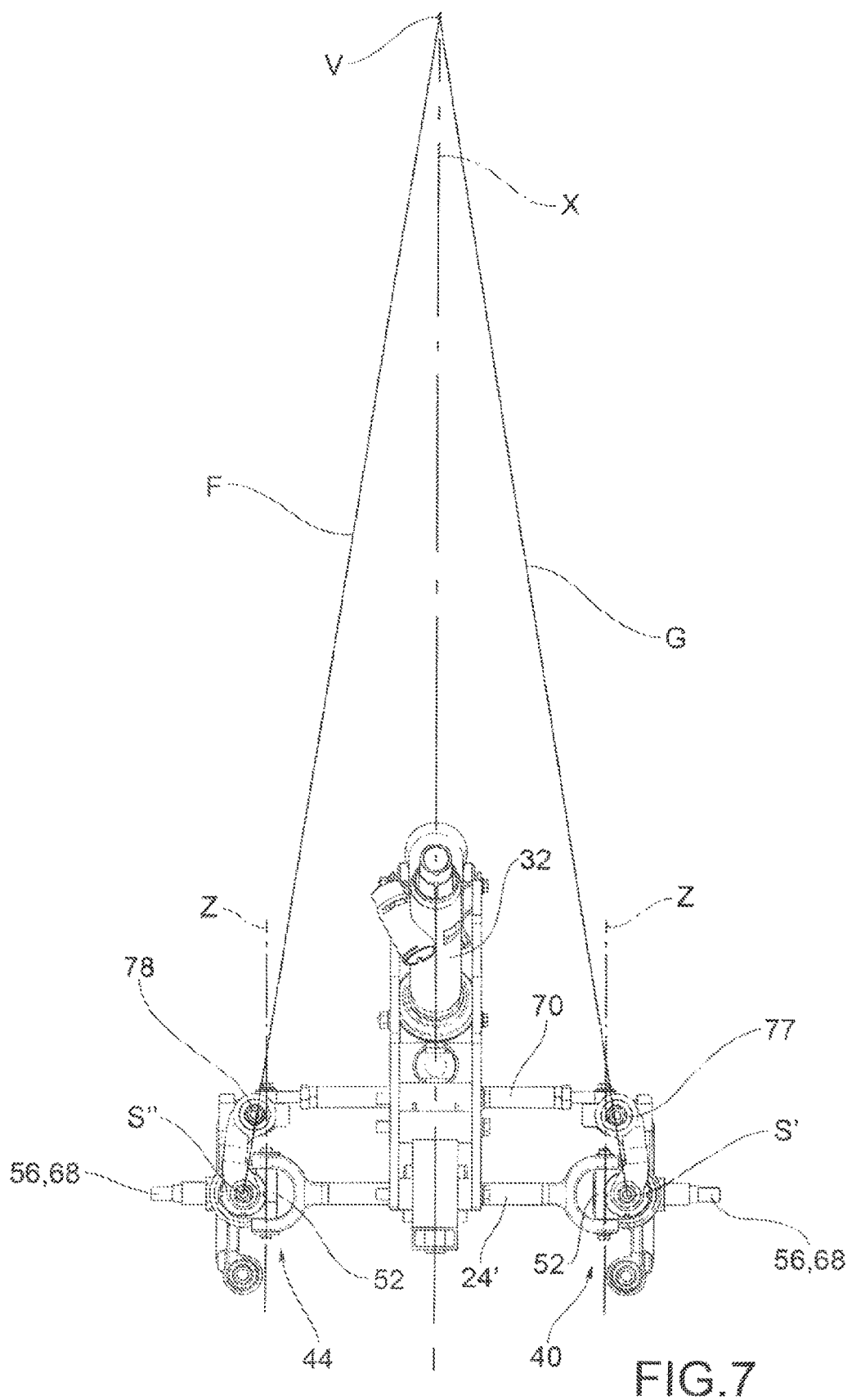
FIG. 7 shows a view of the forecarriage in FIG. 6 from the side of the arrow VII in FIG. 6.
Figure 8:
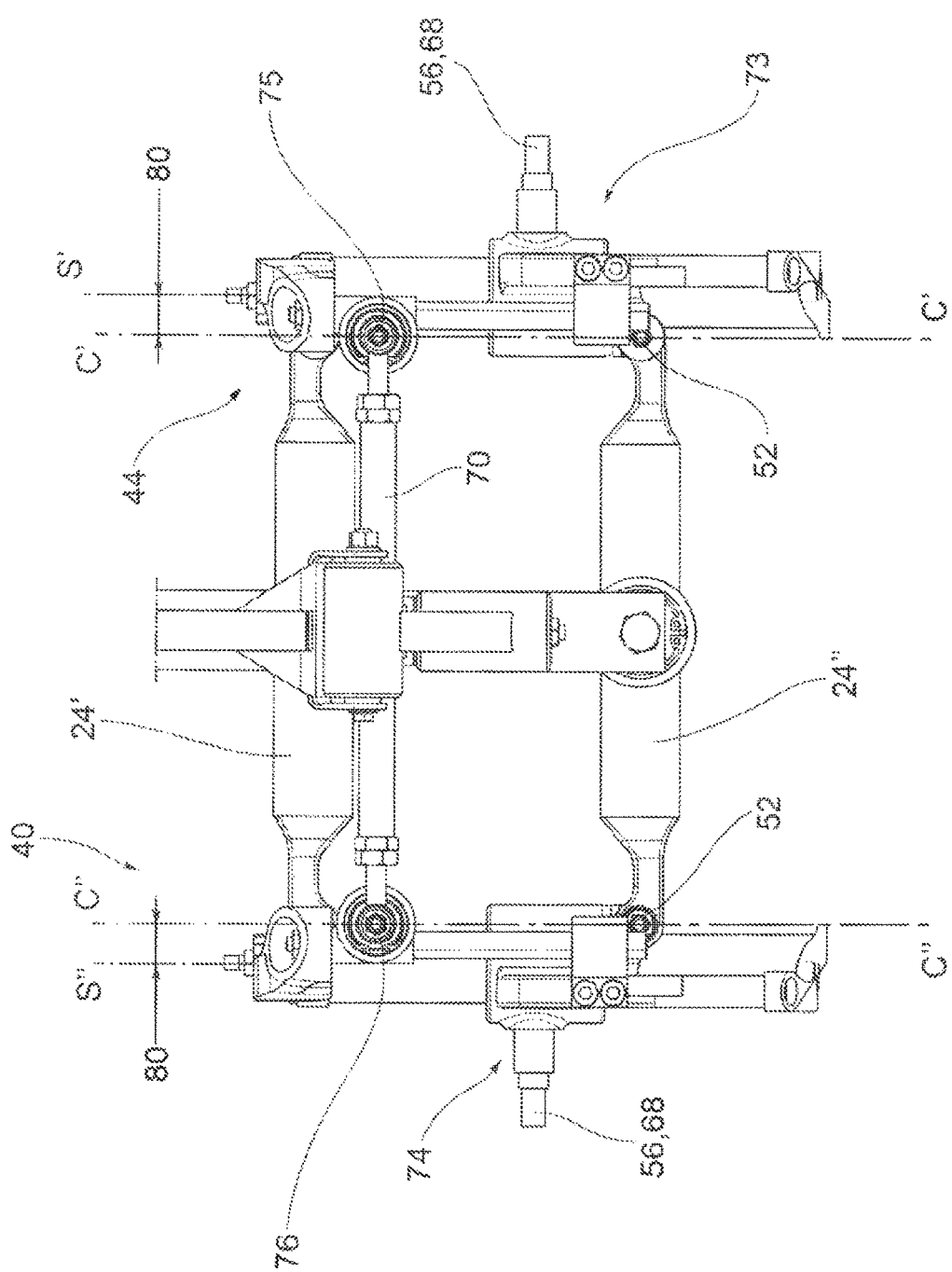
FIG. 8 shows a view of the forecarriage in FIG. 6 from the side of the arrow VIII in FIG. 6.
Figure 9:
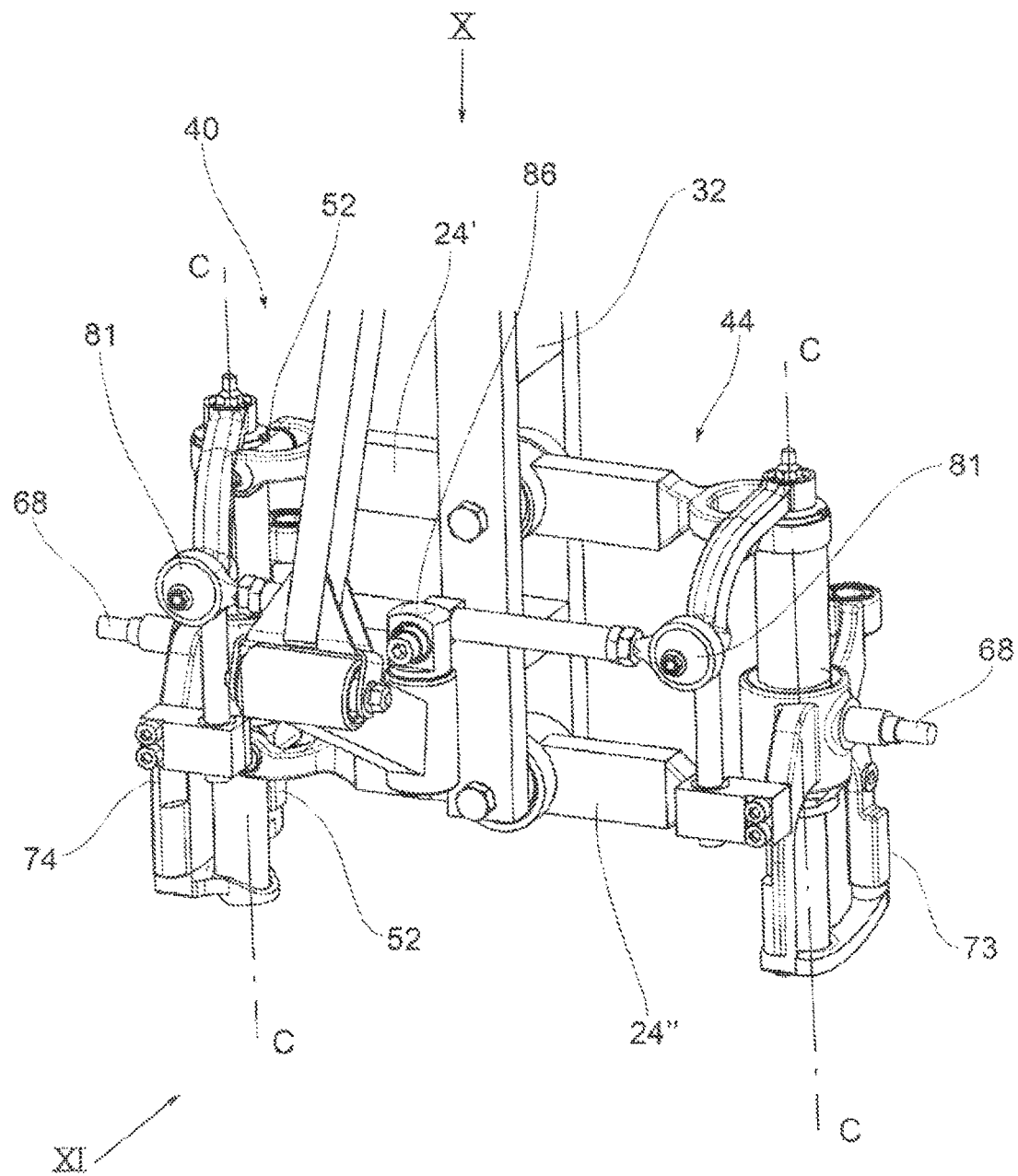
FIG. 9 shows a perspective view of a forecarriage of a motor vehicle according to a further embodiment of the present invention.
Figure 10:
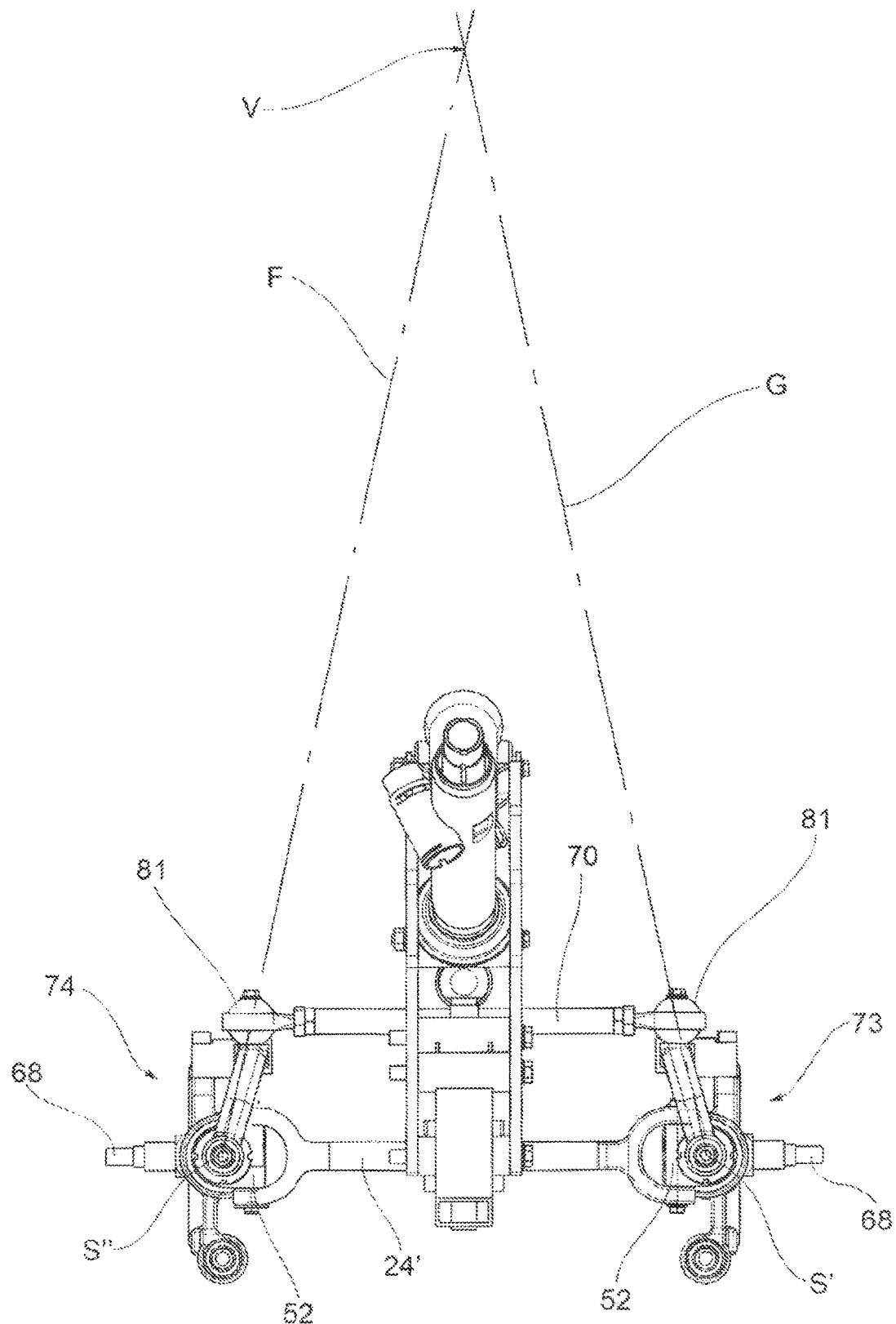
FIG. 10 shows a view of the forecarriage in FIG. 9 from the side of the arrow X in FIG. 9.
Figure 11:
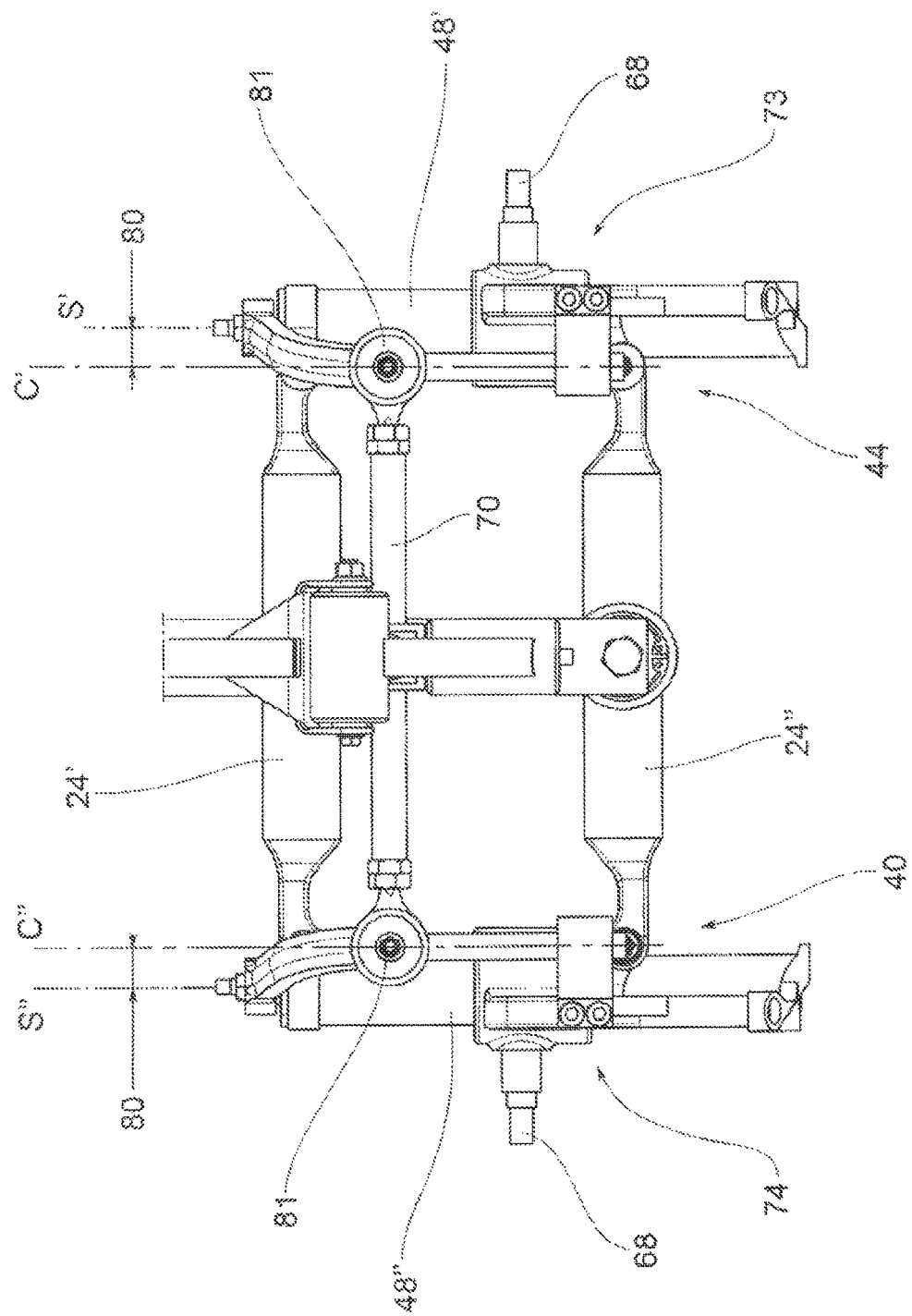
FIG. 11 shows a view of the forecarriage in FIG. 9 from the side of the arrow XI in FIG. 9.
Figure 12:
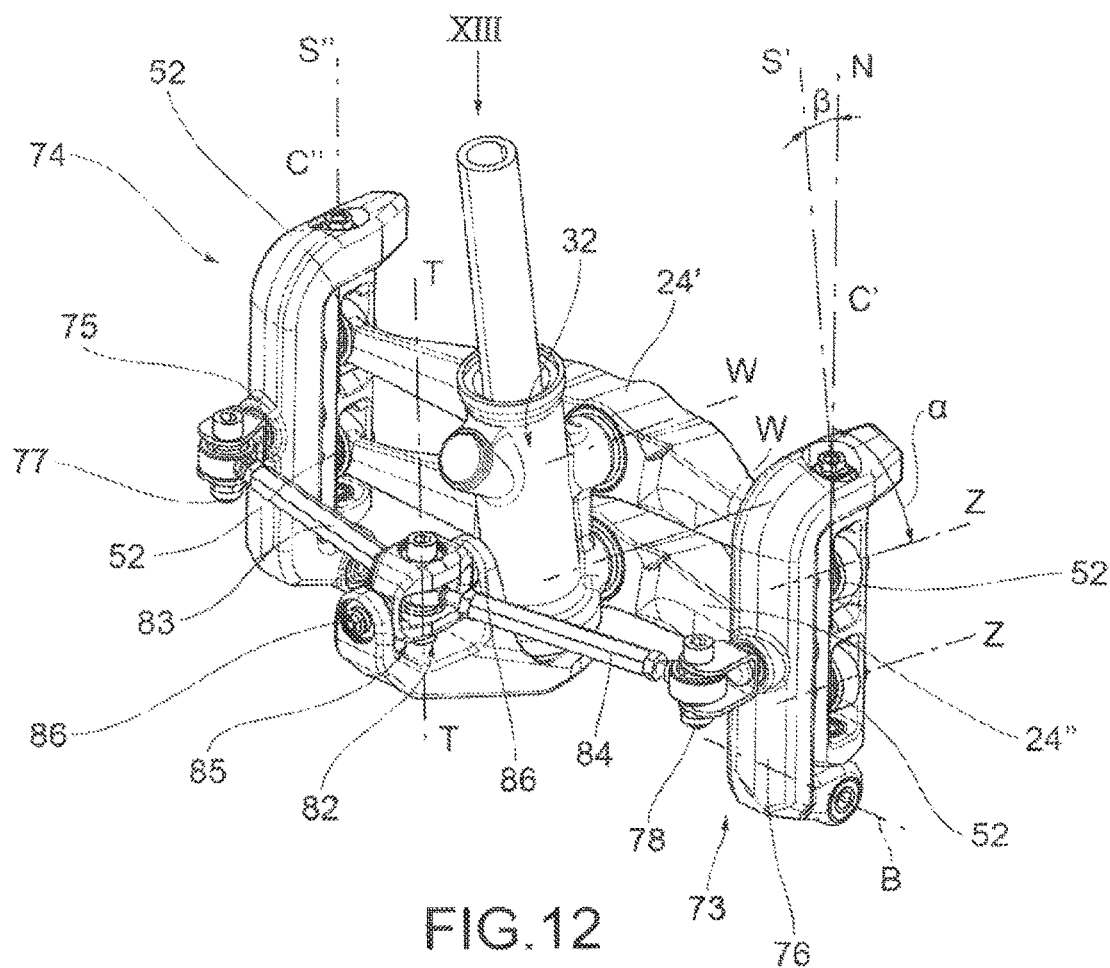
FIG. 12 shows a perspective view of a forecarriage of a motor vehicle according to a further embodiment of the present invention.
Figure 13:
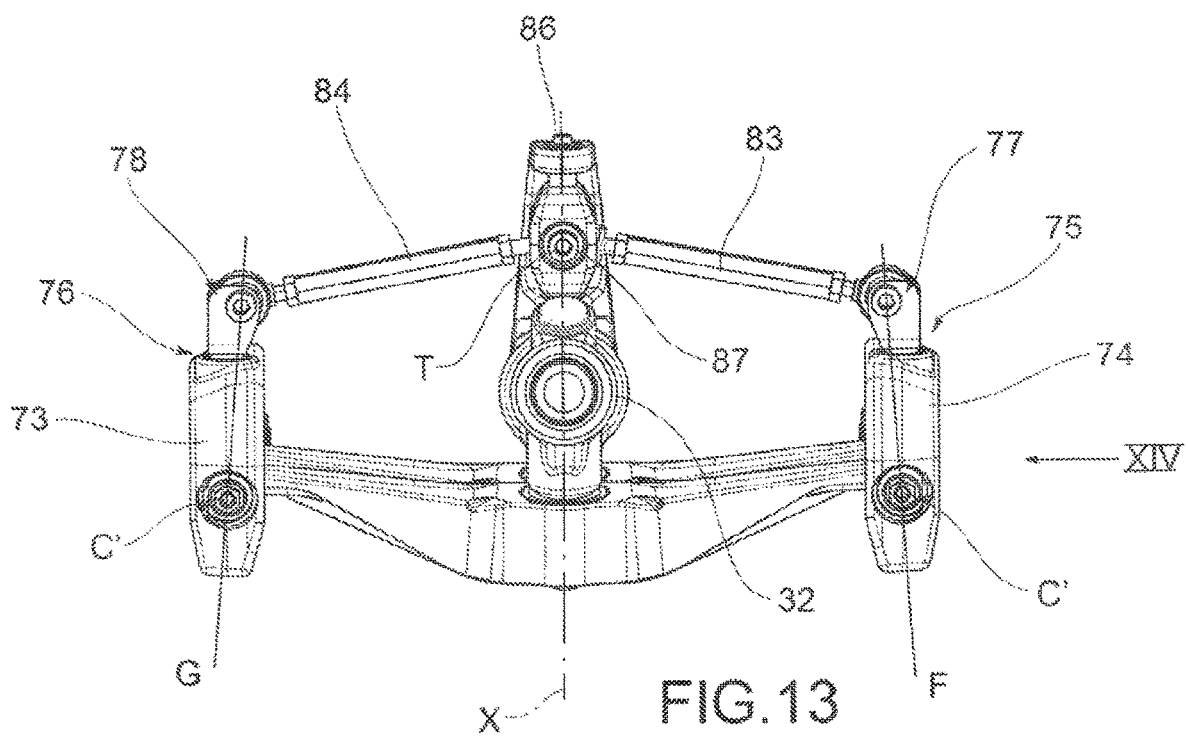
FIG. 13 shows a view of the forecarriage in FIG. 12 from the side of the arrow XIII in FIG. 12.

With reference to the aforementioned figures, reference numeral 4 globally denotes a schematic overall view of a motor vehicle according to the present invention.

For the purposes of the present invention, it should be pointed out that the term motor vehicle should be considered in a broad sense, encompassing any motorcycle having at least three wheels, i.e. two aligned wheels, as described better below and at least one rear wheel. Such definition therefore also comprises so-called quad bikes having two wheels on the forecarriage and two wheels on the rear axle.

The motor vehicle 4 comprises a frame 6 extending from a forecarriage 8, supporting at least two front wheels 10,10', 10", to a rear axle supporting one or more rear wheels 12.

It is possible to distinguish a left front wheel 10' and a right front wheel 10" in which the definition of left and right 10', 10" is purely formal and means in relation to a driver of the vehicle. Said wheels are arranged to the left and right of the centreline plane M-M of the motor vehicle, compared to a point of observation of a driver driving it.

In the following description, and also in the drawings, reference will be made to symmetrical or specular elements of the forecarriage with respect to said centreline plane M-M using the quotes ' and ' to indicate respectively the components to the left and right of the forecarriage, compared to a point of observation of a driver driving it.

For the purposes of the present invention, the frame 6 of the motor vehicle may be any shape, size and may for example be of the lattice type, box type, cradle, single or double, and so forth.

The frame 6 of the motor vehicle can be in one piece or in multiple parts; for example the frame 6 of the motor vehicle interconnects with a rear axle frame which may comprise an oscillating rear fork (not shown) which supports one or more rear drive wheels.

Said rear oscillating fork may be connected to the frame 6 by direct hinging, or by the interposition of a lever mechanism and/or intermediate frames.

The motor vehicle forecarriage 8 comprises a forecarriage frame 16 and a pair of front wheels 10,10',10" kinematically connected to the forecarriage frame 16 by means of an articulated quadrilateral 20.

The articulated quadrilateral 20 comprises a pair of cross members 24,24',24", hinged to the forecarriage frame 16 in correspondence of median hinges 28.

The median hinges 28 identify median hinge axes W-W parallel to each other.

For example said median hinges are fitted on a front beam 32, positioned to straddle a centreline plane M-M passing through a longitudinal direction X-X or the direction of travel of the motor vehicle.

For example, a steering mechanism, connected to a handlebar (not shown) of the motor vehicle 4, is pivoted on a steering column inserted so as to swivel in a steering tube of the frame 6 of the motor vehicle 4, in the known manner.

The cross members 24 extend in a main transverse direction Y-Y between opposite transverse ends 40,44.

In particular, said cross members 24 are connected together, in correspondence of said opposite transverse ends 40, 44, by means of uprights 48, 48', 48" pivoted to said transverse ends 40, 44 in correspondence of lateral hinges 52.

In one embodiment the cross members 24, 24', 24" are mounted cantilevered with respect to the front beam 32.

The cross members 24 and the uprights 48 define said articulated quadrilateral 20. In particular the quadrilateral 20 comprises two cross members 24, i.e. a top cross member 24' and a bottom cross member 24", in which the top cross member 24' is facing the side of the associable handlebar and the bottom cross member 24" is facing towards the ground supporting the motor vehicle 4.

The cross members 24', 24" are not necessarily the same as each other in terms of shape, materials and size; each cross member 24 can be made in one piece or in two or more parts mechanically attached, for example by welding, bolts, rivets and similar.

There are two uprights 48, in particular a left upright 48' and a right upright 48".

The definition of left and right upright 48', 48" is purely formal and means in relation to a driver of the vehicle. Said left and right uprights 48', 48" are arranged to the left and right of a centreline plane M-M of the motor vehicle, compared to a point of observation of a driver driving it.

The lateral hinges 52 are parallel to each other and define respective lateral hinge axes Z-Z.

Preferably, said median 28 and lateral hinges 52 are oriented according to median W-W and lateral Z-Z hinge axes parallel to each other.

The left and right uprights 48', 48" rotatably support the left and right front wheels 10', 10", respectively, around respective steering axes S'-S', S"-S". Said steering axes S'-S',S"-S" are parallel to each other.

Each upright 48 extends from an upper end 60 to a lower end 64.

The top end 60 is facing towards the upper cross member 24' and the lower end 64 is facing the bottom cross member 24". Each front wheel comprises a axle journal 56 of a front wheel 10.

According to one embodiment, each axle journal 56 is mechanically connected to a rotation pin 68 of a front wheel 10 so as to rotatably support the front wheel 10 around a related rotation axis R-R.

Each rotation pin 68 of the front wheel 10 is comprised between the upper end 60 and the lower end 64 of the corresponding upright 48 of the articulated quadrilateral 20.

According to a possible embodiment, the median and lateral hinges 28 and 52 are parallel to each other and perpendicular to said steering axes S'-S', S"-S". In other words, according to one embodiment, compared to a projection plane P passing through said median hinges 28, the steering axes S'-S', S"-S" identify with the median W-W and lateral hinge axes an angle α of 90 degrees.

According to possible embodiments, said angle α is between 80 and 120 degrees and preferably said angle α is between 90 and 110 degrees; even more preferably said angle α is equal to 100 degrees.

The steering axes S'-S', S"-S" with respect to said projection plane P, may be inclined by a steering angle β between 4 and 20 degrees, more preferably between 8 and 16 degrees with respect to a vertical direction N-N, perpendicular to the ground.

According to further embodiments, it is also possible to provide that the hinges 28 and 52 are tilted according to median W-W and lateral hinge axes Z-Z parallel to the ground, i.e. perpendicular to said vertical direction N-N with respect to said projection plane P: in this configuration, said angle β is equal to 0 degrees Furthermore, as seen, it is also possible to provide that the hinges 28 and 52 are not perpendicular to the steering axes S'-S', S"-S": in fact, as described above, said angle α, defined between the steering axes S'-S S'S' and the median W-W and lateral hinges Z-Z with respect to a projection plane P passing through said median hinges 28, is comprised between 80 and 120 degrees.

The parallelism to the ground of the median W-W and lateral hinge axes Z-Z means that, in the rolling motion, the inner wheel with respect to the curve rises upwards almost vertically with the double advantage of uncoupling the rolling motion of the wheel from horizontal braking forces (transmitted from the ground) and of taking up less space towards the bottom of the motor vehicle.

It should be noted that, by tilting the median W-W and lateral axes Z-Z with respect to the steering axes S'-S', S"-S", so that in static conditions at rest said median W-W and lateral hinge axes Z-Z are parallel to the ground, in braking conditions, and therefore compression of the suspensions of the front wheels 10 ', 10' said median W-W and lateral hinge axes Z-Z are inclined moving into a condition of substantial parallelism to the ground. For example, if in static conditions the median W-W and lateral hinge axes Z-Z identify an angle β different from zero with the horizontal direction (which coincides with the angle formed with the vertical direction, which is perpendicular to the horizontal direction), in braking and maximum compression conditions this angle tends to zero.

When, during braking, the median W-W and lateral Z-Z hinge axes position themselves substantially parallel to the ground, the braking forces, horizontal and thus parallel to the ground, are prevented from triggering, alone, a juddering of the wheels since they have no components along their excursion movement, which proves practically orthogonal to the ground, i.e. vertical.

In addition, it should be noted that the upper 60 and lower 64 ends of the uprights 48', 48", are placed above and below the rotation pin 68 of the respective front wheels 10',10 "and not completely over it, as occurs in the solutions of the prior art.

In other words, each rotation pin 68 of the front wheel 10', 10" is comprised between the upper end 60 and the lower end 64 of the corresponding upright 48, 48', 48" of the articulated quadrilateral 20.

This implies that the stiffness of the connection between each wheel 10',10" and the articulated quadrilateral, comprising the suspension, is a more rigid order of magnitude than happens in the aforementioned solutions of the prior art, helping to make the possibility more remote that an alternating resonance of the front wheels 10', 10" may take over due to braking forces or an asymmetric impact. Consequently the present invention helps overall to provide a vehicle that is lightweight but also safe, precise and that conveys to the driver a feeling of safety at the forecarriage, in that it does not transmit to the user vibrations or juddering at the handlebar.

Furthermore, the positioning of the upper and lower 24', 24" cross members of the articulated quadrilateral in the vertical dimension of the wheels makes it possible to move the barycentre of the forecarriage, and therefore of the vehicle, downwards, improving the dynamic behaviour of the vehicle.

The forecarriage 8 comprises a steering bar 70 kinematically associated with a handlebar (not shown), wherein the steering bar 70 extends between opposite lateral ends 71,72 at which it is kinematically connected to wheel support elements 73,74 of each wheel 10', 10" joined to the uprights 48',48", so as to control the steering rotation of said front wheels 10',10" around respective steering axes S'-S', S"-S".

At said lateral ends 71,72, the steering bar 70 is kinematically connected to each wheel support element 73, 74 by means of a first and a second roll hinge 75,76, and by means of a first and a second steering hinge 77,78 respectively perpendicular to said first and second roll hinge 75,76.

Perpendicular hinges are understood to mean that the hinges define hinge axes perpendicular to each other.

The roll hinges 75,76 are parallel to said median hinges 28 and placed at a distance from each other equal to the distance between the lateral hinges 52 of each cross member 24', 24" and are aligned with the latter along the uprights 48', 48".

In conditions of the wheels being straight and parallel to the direction of travel or longitudinal direction X-X of the vehicle, the first and second steering hinges 77,78 are arranged offset from the cross members 24', 24" in the longitudinal direction X-X such that, with respect to a projection plane Q parallel to the ground, the straight lines F, G joining the steering axes S'-S', S"-S" with the first and second steering hinges 77,78, intersect at a support point V of the rear wheel on the ground, passing through a centreline plane M-M of the vehicle.

Said first and second roll hinge 75,76 are respectively orthogonal to said steering axes S'-S', S"-S".

Preferably said steering hinges 77,78 are positioned between each roll hinge 75,76 and a centreline plane M-M of the vehicle.

According to one embodiment, said roll hinges 75,76 and said steering hinges 77,78 are cylindrical hinges, perpendicular to each other.

According to one embodiment, at said lateral ends 71,72, the steering bar 70 comprises a cardan joint fitted with a spider 79 defining a roll hinge 75,76 and a steering hinge 77,78, perpendicular and incident to each other.

According to one embodiment, the steering bar 70 is set back from the cross members 24', 24" with respect to a direction of advancement in the longitudinal direction X-X of the vehicle.

According to a further embodiment, the steering bar 70 is set forward from the cross members 24', 24" with respect to a direction of advancement in the longitudinal direction X-X of travel of the vehicle.

According to one embodiment, the roll hinges 75,76 are aligned with each other along a vertical axis C-C parallel to each upright 48', 48", and wherein each vertical axis (C'-C', C"-C" is offset relative to the corresponding steering axis S'-S', S"-S" according to a transverse distance 80 (offset), with respect to a projection plane perpendicular to a centreline plane M-M of the vehicle, Advantageously, the steering hinges 77,78 are arranged at a distance from each other such that, with respect to a projection plane Q parallel to the ground, the straight lines F, G joining the steering axes S'-S', S"-S" with the first and second steering hinges 77,78, intersect at a support point V of the rear wheel on the ground, passing through a centreline plane M-M of the vehicle.

According to a possible embodiment, said roll hinges 75,76 and said steering hinges 77,78 intersect each other.

In particular the roll hinges 75,76 and the steering hinges 77,78 may co-penetrate in spherical hinges 81 which perform both the roll function and the steering function.

According to one embodiment, the steering bar 70 is in one piece pivoted to the forecarriage frame 16 at a median point 82 of the forecarriage frame 16 defining a median steering axis T-T. According to a possible embodiment, said median steering axis T-T is parallel to the steering axes S'-S',S"-S".

According to a further embodiment, the steering bar 70 comprises two rods 83,84 each hinged to one of said wheel support elements 73,74 and to the same median point 82 of the forecarriage frame 16, defining a median steering axis T-T. According to a possible embodiment, said median steering axis T-T is parallel to said steering axes S'-S',S"-S".

For example at said median point 82, a cross joint 85 is provided defining a median roll hinge 86 and a median steering hinge 87, perpendicular and incident to each other.

Figure 16:
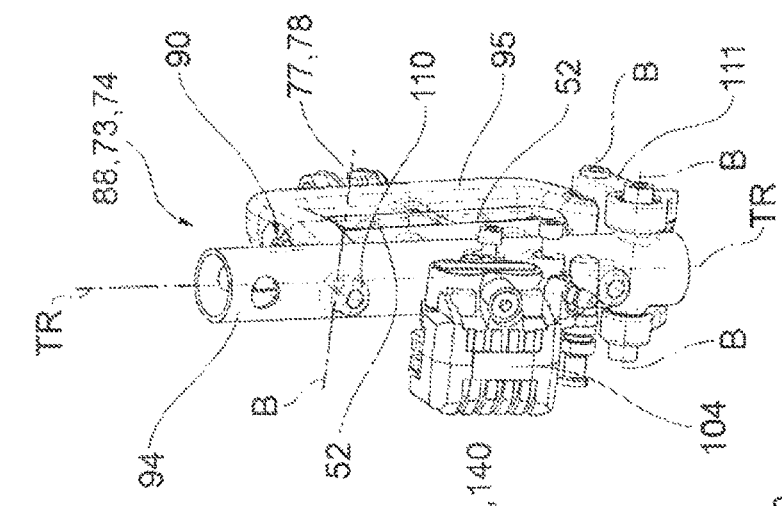
FIGS. 14-16 show views from different angles of the detail XIV in FIG. 13.
Figure 15:
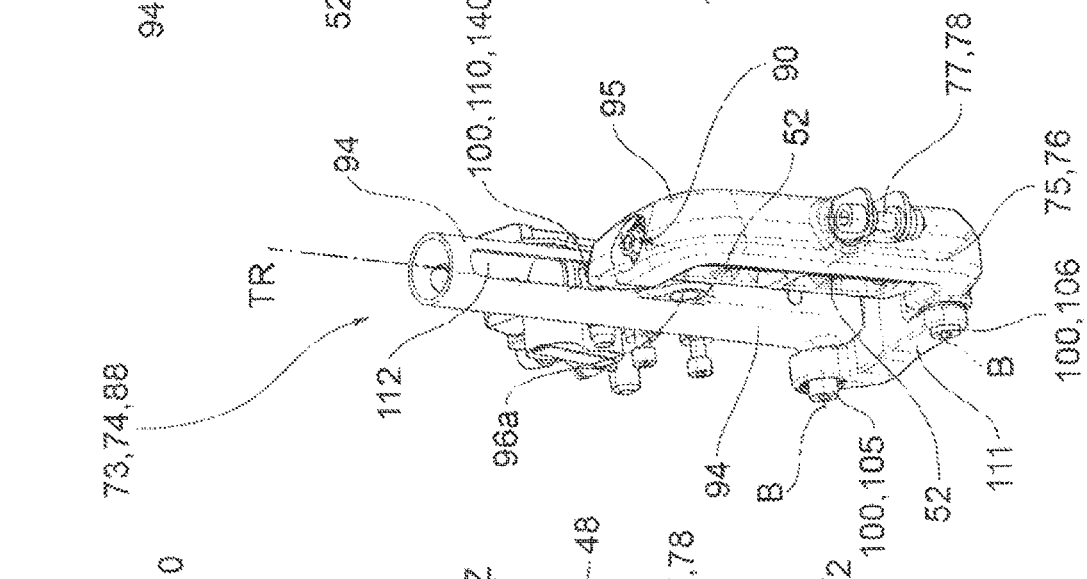
Figure 14:
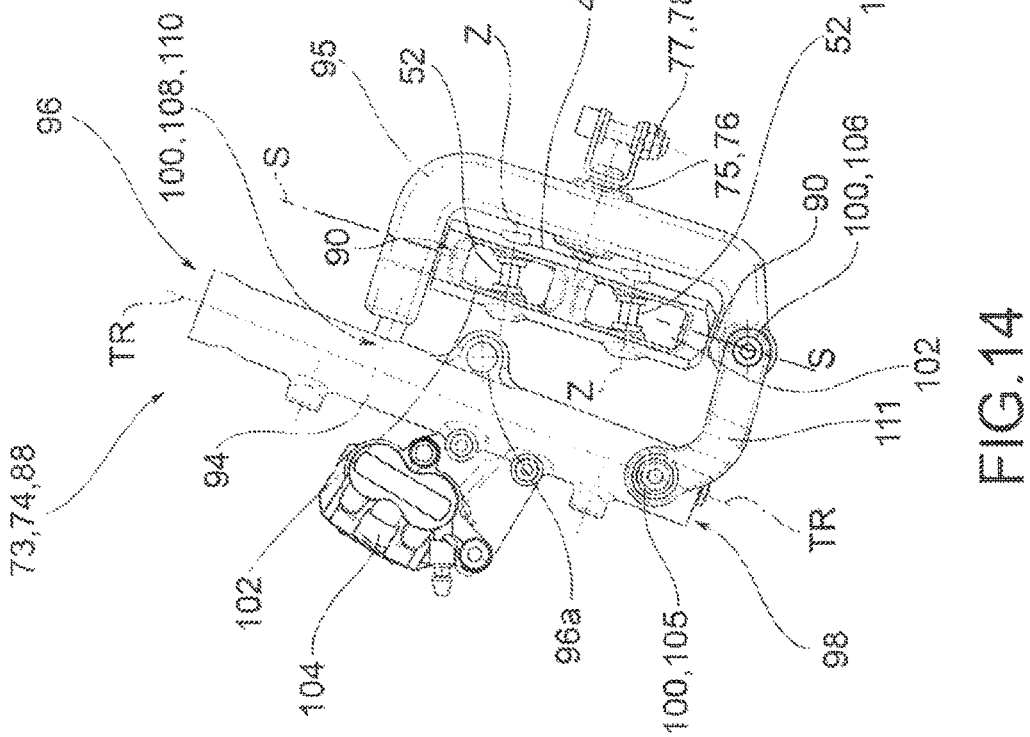
Figure 17:
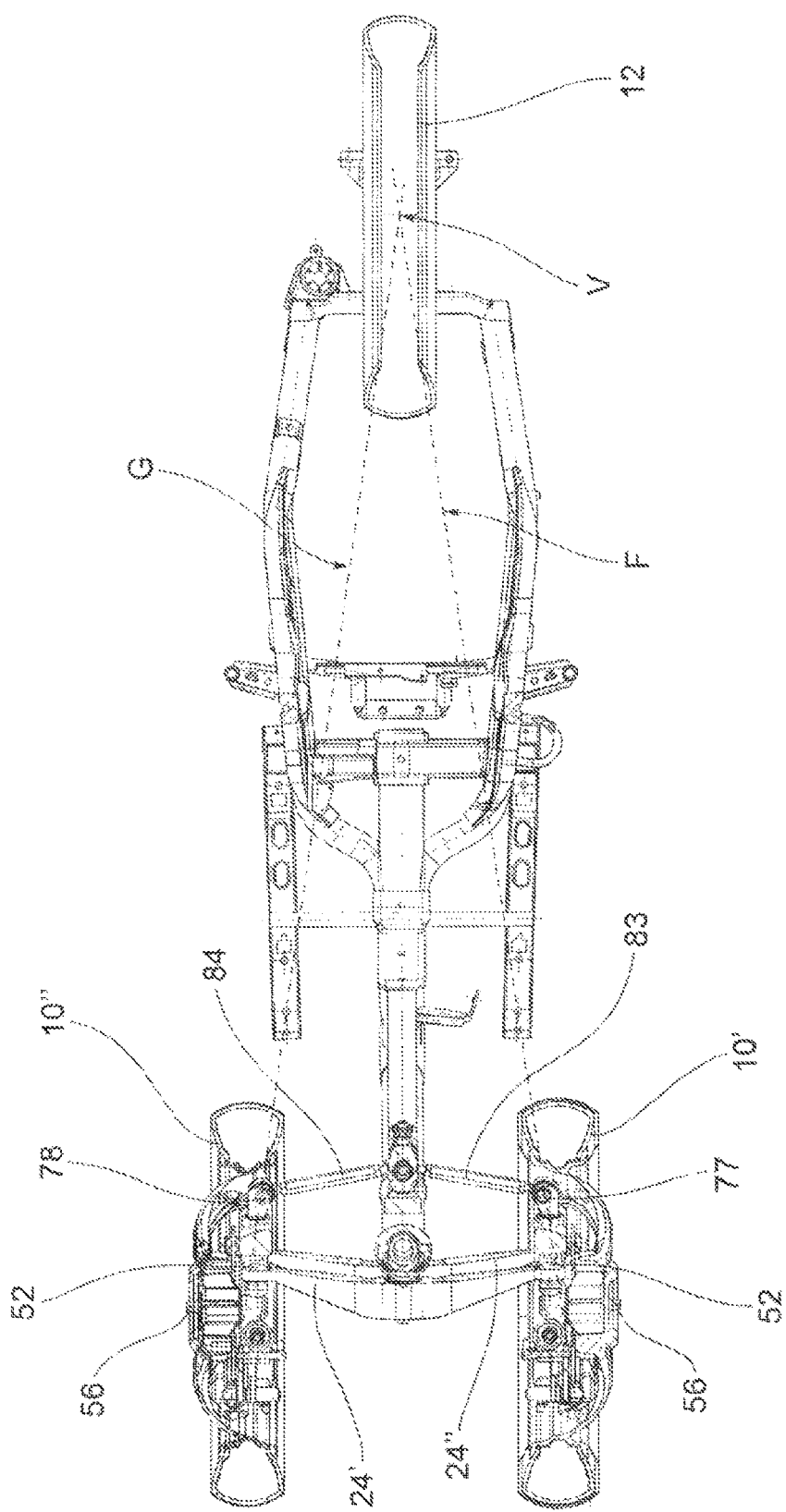
FIG. 17 shows a plan view of a motor vehicle comprising the forecarriage in FIGS. 12-16.

According to one embodiment (FIGS. 14-17) at each front wheel 10', 10", the wheel support elements 73,74 comprise a tilting support structure 88 for the axle journal 56 of each front wheel 10',10", mechanically connected to the rotation pin 68 of each front wheel 10',10" so as to rotatably support the front wheel 10',10" around its rotation axis R'-R', R"-R".

Advantageously, said tilting support structure 88 is hinged to the articulated quadrilateral 20 by means of steering pins 90 arranged in correspondence of the upper ends 60 and lower ends 64 of each upright 48', 48", said steering hinges defining respective steering axes S'-S', S"-S" of the wheels 10', 10" parallel to each other.

Preferably, the steering axes S'-S', S"-S" coincide with axes of symmetry of said uprights 48',48" respectively.

Each wheel 10',10" comprises a centreline plane of the wheel R'-R', R"-R", wherein said centreline plane of the wheel R'-R',R"-R" passes through the steering axis S'-S', S"-S" of each front wheel 10',10" respectively.

Preferably said tilting support structure 88 is entirely contained within a volume 92 delimited by a rim 93 of each wheel 10', 10".

Preferably, said volume 92 is facing with respect to a centreline plane M-M of the forecarriage 8 passing through said median hinges 28. In other words, the axle journals 56 are facing inward towards the centreline plane M-M of the motor vehicle and the relative components associated with the axles journals 56 are not directly visible to an outside observer.

According to a preferred embodiment, said tilting support structure 88 comprises a wheel guide 94 connected to said axle journal 56 of the front wheel 10', 10", a support bracket 95 hinged to the articulated quadrilateral 20 by means of said steering pins 90.

The wheel guide 94 is connected to the rotation pin 68 and rotatably supports said rotation pin 68 of the corresponding wheel 10', 10' in correspondence with a special wheel attachment 96a.

The wheel guide 94 extends between opposite upper and lower axial ends 96, 98; preferably, at said opposite axial ends 96, 98, the wheel guide 94 is mechanically connected to connection elements to the frame.

Such straight wheel guide 94 defines a shaking axis TR-TR for each wheel 10', 10".

For example, the wheel guide 94 is in turn hinged to the support bracket 92 at opposite upper and lower axial ends 96,98 of the wheel guide 94, by at least three tilting hinges 100 which define respective tilting axes B-B and which realise a roto-translational connection between the wheel guide 94 and the support bracket 95.

Preferably the transverse ends 40,44 of the upper and lower cross members 24',24" of the articulated quadrilateral 20 are at least partially housed inside transversal seats 102 made inside said uprights 48', 48".

Preferably, to each wheel guide 94 braking means 104 of the corresponding wheel 10', 10" are attached, typically disc brake calipers.

The wheel guide 94 is in turn hinged to the support bracket 95 in correspondence of opposite upper and lower axial ends 96, 98, by means of at least three tilting hinges 100, 105, 106, 110 that define respective tilting axes B-B and that realise a roto-translational connection between the wheel guide 94 and the support bracket 95.

Preferably, the wheel guide 94, the support bracket 95 and tilting hinges 100,105,106,110 define a peripherally closed tilting structure support 88.

According to one embodiment, the rotation pin 68 of each wheel 10', 10" is positioned inside said peripherally closed tilting support structure 88 and/or the lateral hinges 52 and the respective upright 48',48" are positioned inside said peripherally closed tilting support structure 88.

For example, the tilting support structure 88 comprises a connecting rod 111 doubly hinged to the support bracket 95 and to the wheel guide 94 at a first and a second tilting hinge 105,106.

For example, the tilting support structure 88 comprises a pin 108 hinged to the support bracket 95 and to the wheel guide 94 at a third tilting hinge 110.

The pin 108 can also translate along a slot 112 made on the wheel guide 94.

According to one embodiment, said tilting hinges 100, 105,106,110 are hinged to the support bracket 95 and to the wheel guide 94 at tilting axes B-B perpendicular to a centreline plane R'-R', R"-R" of each wheel 10', 10" and perpendicular to the steering axes S'-S', S"-S" defined by said steering pins 90.

As mentioned above, the motor vehicle 4 according to the present invention comprises at least one rear drive wheel 14; according to a possible embodiment, the vehicle has two rear drive wheels 14 at the rear axle 12.

For example, in such embodiment, in which the motor vehicle is a quadricycle, the rear drive wheels 14 at the rear axle 12 are connected to each other and to a rear axle frame 13 by means of an articulated quadrilateral 20 as described above in relation to the front wheels 10.

As may be appreciated from the description, the present invention makes it possible to overcome the drawbacks mentioned of the prior art.

Advantageously, the present invention improves the dynamic behaviour of the vehicle compared to the prior art.

In fact, with the steering straight, the steering corrections are null with the rolling of the vehicle and are in any case small for small steering angles; considering that when driving a rolling vehicle the user seldom steers more than a few degrees, since the curve is imposed and covered thanks to the tilting movement of the vehicle itself, the present invention represents a substantial improvement on the known layouts.

As a result the steering or handlebar can be operated and rotated easily by the user since, the steering corrections being extremely limited, the reactions transmitted by the wheels to said steering are practically negligible. Therefore, the steering is not heavy or awkward to operate by a user.

Moreover, the absence or the negligibility of the steering correction limits the wear on the tyres.

Moreover, the absence or negligibility of the steering correction transmits a steering precision to date not found in tilting three-wheeled vehicles. In fact the driver always has the feeling of remarkably precise steering, i.e. has the feel of a remarkable and smooth directionality of the vehicle, without any abnormal reaction to steering, even when cornering.

Lastly, the motor vehicle according to the present invention is able to guarantee not only high stability, superior to that of a motorcycle with two wheels, thanks to the presence of two paired front wheels, but also remarkable handling and ease of leaning, typical of a motorcycle with only two wheels.

A person skilled in the art may make numerous modifications and variations to the solutions described above so as to satisfy contingent and specific requirements while remaining within the sphere of protection of the invention as defined by the following claims.

The invention claimed is:

1. A motor vehicle comprising:
a forecarriage comprising a forecarriage frame,
a pair of front wheels kinematically connected to the forecarriage frame by means of an articulated quadrilateral,
said articulated quadrilateral comprising a pair of cross members, hinged to the forecarriage frame in correspondence of median hinges,
said cross members being connected together, at opposite transversal ends, by means of uprights pivoted at said transversal ends at lateral hinges, each upright extending from an upper end and a lower end, the upper end facing the upper cross member and the lower end facing the lower cross member, the cross members and the uprights defining said articulated quadrilateral,
wherein the forecarriage further comprises a steering bar mechanically associated with handlebars, wherein the steering bar extends between opposite lateral ends at which it is mechanically connected to wheel support elements of each wheel joined to the uprights, so as to control the rotation of said front wheels around respective steering axes, and
wherein the median and lateral hinges are oriented according to median and lateral hinge axes parallel to each other,
wherein at said lateral ends, the steering bar is mechanically connected to each wheel support element by means of a first and a second roll hinge and by means of a first, and a second steering hinge,
wherein the steering axes identify with the median and lateral hinge axes at an angle between 80 and 120;
wherein the roll hinges are parallel to the median and lateral hinges;
wherein the steering hinges are parallel to the steering axes;
wherein the roll hinges are placed at a distance from each other equal to the distance between the lateral hinges of each cross member and are aligned with the lateral hinges along the uprights, and
wherein, in conditions of the wheels being straight and parallel to the forward direction, the first and second steering hinges are arranged offset from the cross members in the longitudinal direction such that, with respect to a projection plane parallel to the ground, straight lines joining the steering axes with the first and second steering hinges, intersect at a point of contact of a rear wheel with the ground, passing through a centerline plane of the vehicle.

2. The motor vehicle according to claim 1, wherein said first and second roll hinge are respectively orthogonal to said steering axes.

3. The motor vehicle according to claim 1, wherein said steering hinges are positioned between each roll hinge and a centerline plane of the vehicle.

4. The motor vehicle according to claim 1, wherein said roll hinges and said steering hinges are cylindrical hinges, perpendicular to each other.

5. The motor vehicle according to claim 1, wherein at said lateral ends, the steering bar comprises a cardan joint fitted with a spider defining a roll hinge and a steering hinge, perpendicular and incident to each other.

6. The motor vehicle according to claim 1, wherein the steering bar is set back from the cross members with respect to a direction of advancement in a longitudinal direction of travel of the vehicle.

7. The motor vehicle according to claim 1, wherein the steering bar is set forward of the cross members with respect to a direction of advancement in a longitudinal direction of travel.

8. The motor vehicle according to claim 1, wherein the roll hinges are aligned with each other, and on a respective vertical axis, each respective vertical axis is parallel to an upright, and wherein each vertical axis is offset relative to the corresponding steering axis in a transverse distance, with respect to a projection plane perpendicular to a centerline plane of the vehicle, and
wherein the steering hinges are arranged at a distance from each other such that, with respect to a projection plane parallel to the ground, the straight lines joining the steering axes with the first and second steering hinges, intersect at the support point of the rear wheel on the ground, passing through the centerline plane of the vehicle.

9. The motor vehicle according to claim 8, wherein said roll hinges and said steering hinges intersect each other.

10. The motor vehicle according to claim 9, wherein the roll hinges and the steering hinges co-penetrate in spherical hinges which perform both the roll function and the steering function.

11. The motor vehicle according to claim 1, wherein the steering bar is in one piece pivoted to the forecarriage frame at a midpoint of the forecarriage frame defining a median steering axis.

12. The motor vehicle according to claim 11, wherein at said median point, a cross joint is provided defining a median roll hinge and a median steering hinge, perpendicular and incident to each other.

13. The motor vehicle according to claim 1, where the steering bar comprises two rods each hinged to one of said wheel support elements and to the same midpoint of the forecarriage frame, defining a median steering axis.

14. The motor vehicle according to claim 1, wherein at each front wheel, the wheel support elements comprise a tilting support structure for an axle journal of each front wheel, mechanically connected to a rotation pin of a front wheel so as to rotatably support the front wheel around its rotation axis,
said tilting support structure being hinged to the articulated quadrilateral by means of steering pins placed at the upper ends and lower ends of each upright, said steering pins defining respective steering axes of the wheels parallel to each other.

15. The motor vehicle according to claim 14, wherein said steering axes coincide with axes of symmetry of said uprights respectively.

16. The motor vehicle according to claim 14, wherein each wheel comprises a centerline plane of the wheel, wherein each centerline plane of the wheel goes through the steering axis of each front wheel respectively.

17. The motor vehicle according to claim 14, wherein said tilting support structure comprises:
a wheel guide connected to said rotation pin of a front wheel at a special wheel attachment,
a support bracket hinged to an articulated quadrilateral by means of said steering pins,
the wheel guide being in turn hinged to the support bracket in correspondence of opposite upper and lower axial ends, by means of at least three tilting hinges which define respective tilting axes and which form a roto-translational connection between the wheel guide and the support bracket.

18. The motor vehicle according to claim 17, wherein the wheel guide, the support bracket and tilting hinges define a peripherally closed tilting structure support.

19. The motor vehicle according to claim 18, wherein the rotation pin of each wheel is positioned inside said peripherally closed tilting support structure and/or the lateral hinges and the respective upright are positioned inside said peripherally closed tilting support structure.

20. The motor vehicle according to claim 17, in which the tilting support structure comprises a connecting rod doubly hinged to the support bracket and to the wheel guide at a first and a second tilting hinge.

21. The motor vehicle according to claim 17, wherein the tilting support structure comprises a pin hinged to the support bracket and to the wheel guide at a fourth tilting hinge.

22. The motor vehicle according to claim 17, wherein such tilting hinges are hinged to the support bracket and to the wheel guide at tilting axes perpendicular to a centerline plane of each wheel and perpendicular to the steering axes defined by said steering pins.

23. The motor vehicle according to claim 1, wherein the transverse ends of the upper and lower cross members are at least partially housed inside transversal seats made inside said uprights.

24. The motor vehicle according claim 1, wherein the median and lateral hinges are parallel to each other and orthogonal to the steering axes, so that with respect to a projection plane passing through said median hinges, the steering axes identify with the median and lateral hinge axes, an angle of 90 degrees.

25. The motor vehicle according to claim 1, wherein the steering axes, with respect to a projection plane passing through said median hinges, are inclined by a steering angle of between 4 and 20 degrees compared to a vertical direction, perpendicular to the ground.

26. The motor vehicle according to claim 1, wherein the median and lateral hinges are inclined according to median and lateral hinge axes parallel to the ground.

* * * * *